United States Patent [19]

Repay et al.

[11] 4,041,793
[45] Aug. 16, 1977

[54] ELECTRICALLY ADJUSTABLE VEHICLE ACCESSORY

[75] Inventors: Laszlo N. Repay, Chagrin Falls; Thomas A. Young, Burton, both of Ohio

[73] Assignee: Tenna Corporation, Cleveland, Ohio

[21] Appl. No.: 685,698

[22] Filed: May 12, 1976

Related U.S. Application Data

[62] Division of Ser. No. 470,569, May 16, 1974, Pat. No. 3,972,597.

[51] Int. Cl.$^2$ .................. F16H 1/18; F16H 55/22; B62D 1/20; F16C 1/10
[52] U.S. Cl. .................. 74/424.8 R; 74/424.8 A; 74/459; 74/499; 74/501 M
[58] Field of Search ............ 74/424.8 R, 425, 501 M, 74/499, 459, 424.8 A

[56] References Cited

U.S. PATENT DOCUMENTS

| | | | |
|---|---|---|---|
| 3,546,930 | 12/1970 | Flarsheim | 74/459 X |
| 3,733,914 | 5/1973 | Sheesley | 74/424.8 A X |
| 3,965,761 | 6/1976 | Stanley | 74/459 X |

Primary Examiner—Leonard H. Gerin
Attorney, Agent, or Firm—Watts, Hoffmann, Fisher & Heinke

[57] ABSTRACT

An assembly, specifically a mirror assembly for a motor vehicle, in part angularly adjustable by an electric motor and drive mechanism. A fixed motor drives a worm that is angularly movable through a flexible coupling into selective engagement with one of two nuts to drive adjusting screws that cause a mirror element to pivot about one of two mutually perpendicular axes. The screws and pivot structure for the mirror are integrally formed as part of a mirror supporting plate. The nuts are yieldably coupled to the threads of the adjusting screws to permit slippage between the two when forces exceed the wormed driving force. Operating noise is reduce by a vibration-damping motor mounting and by structure limiting worm engagement with the nuts. Projections are carried by the mirror supporting plate resiliently biased against a fixed support to reduce vibration.

6 Claims, 20 Drawing Figures

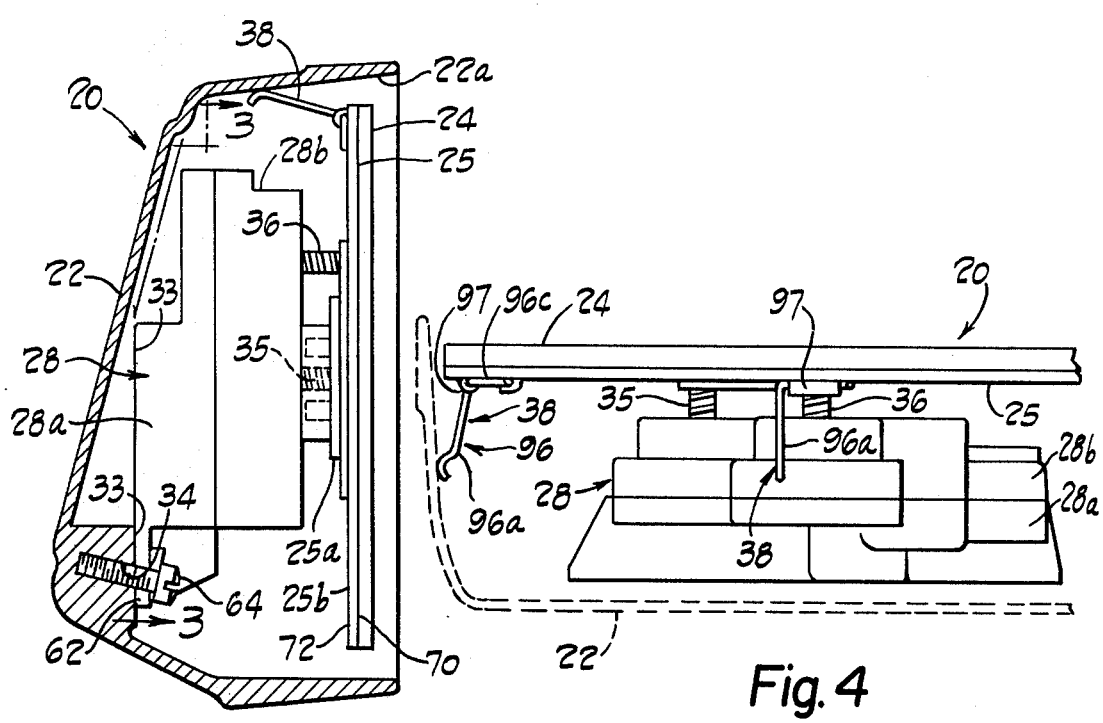
Fig. 2
Fig. 4
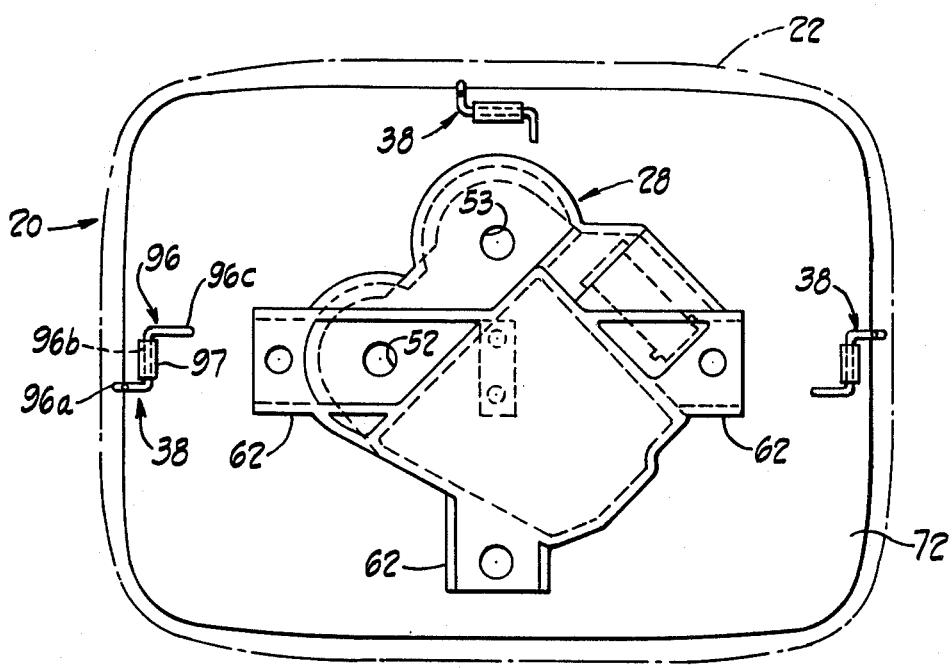
Fig. 3

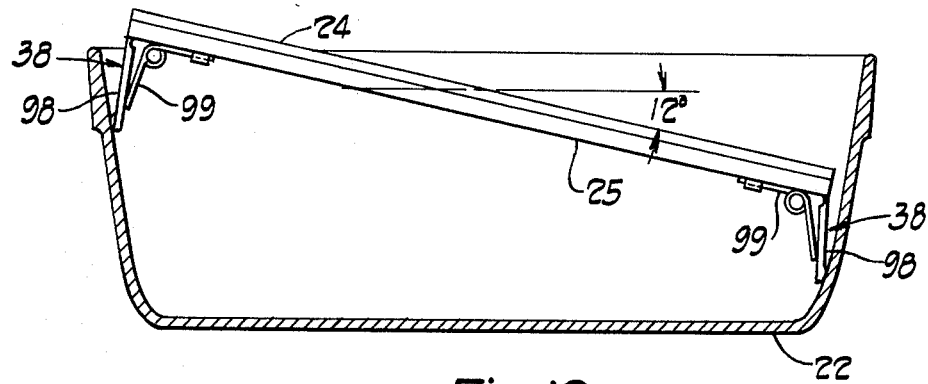
Fig. 10
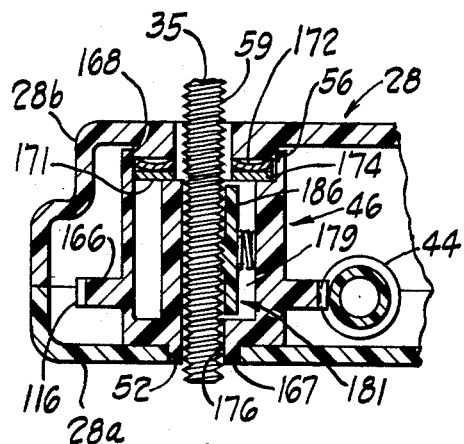
Fig. 11
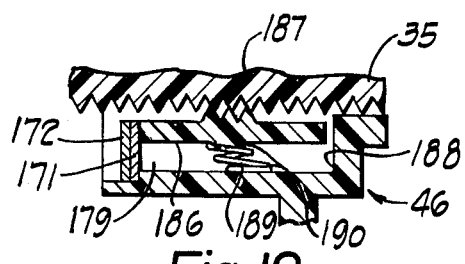
Fig. 12
Fig. 13
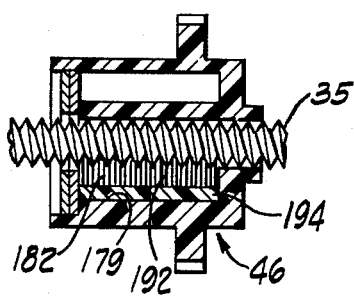
Fig. 15
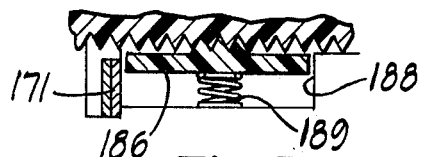
Fig. 14

ELECTRICALLY ADJUSTABLE VEHICLE ACCESSORY

This is a division of application Ser. No. 470,569 filed May 16, 1974, now U.S. Pat. No. 3,972,597.

BACKGROUND OF THE INVENTION

1. Field of the Invention

This invention relates to a motor vehicle accessory, and more particularly a rear view mirror, angularly adjustable by an electrically driven motor.

2. Prior Art

Rear view mirrors mounted outside a motor vehicle and adjustable from inside the vehicle are known and the advantages are well recognized. The desirability of controlling the adjustment through an electric motor and transmission located within the mirror housing are also recognized and various structures have been proposed in the art for motor operated mirrors. See, for example, U.S. Pat. No. 3,609,014.

As shown by the above mentioned patent, it has been proposed to adjust a centrally pivoted mirror about horizontal and vertical axes using screws connected with the back of the pivoted mirror, and advanced or retracted by rotatable nuts, drive either by separate motors and worms or by a single motor and worm pivoted at the opposite end of the motor to selectively engage one or the other nuts.

As a further example of known systems for electrically adjusting mirrors, the assignee of this application has previously considered an electrically operable mirror similar to that described above using a single electric motor centrally pivoted to engage a worm driven by the motor with one of two rotary nuts to adjust lead screws connected to a pivoted mirror.

The known structures as exemplified above have the disadvantage of requiring relatively expensive mirror supporting plate structure and connections for pivoting and adjusting the mirror relative to a fixed support. The use of a separate electric motor for each screw is, of course, expensive and bulky. A single electric motor pivoted at one end is subjected to inertia forces of the vehicle, which affect the engagement of the drive members. Even where the motor is centrally pivoted, the entire mass of the motor must be swung or pivoted to change engagement of the drive between one rotary nut and the other, and the motor mount of necessity is not firm.

Typically, operation of such motor driven mirrors has been noisy. Analysis has shown the noise is generated from drive motor vibration and over engagement between the worm drive and the worm wheel teeth of the rotary nuts. Additional noise is generated and a certain degree of binding between the nuts and the adjusting screws is created in prior art arrangements, because the typical universal ball type connection between the adjusting screws and the mirror backing, does not fully adjust to maintain accurate axial alignment between the screws and nuts. This can become troublesome at the extremes of the adjustment range.

Also, previous constructions, having a central pivot for the mirror backplate, have typically utilized a number of parts in forming a firm but pivotal connection to a fixed support, including ball and clamping sockets and spring tensioning devices, which require undesirable assembly time in manufacture and which do not always function satisfactorily.

One problem in the use of motor adjusted mirrors has been that the mirrors are sometimes subjected to external forces, for example, through attempts to adjust the mirror angle by hand. In the absence of some accommodation for such forces, the drive mechanism is likely to become damaged in use. Further, in the event the mirror element should be restrained against movement when the adjusting motor is operated, as by snow or ice, between the housing and mirror, the motor in the typical drive arrangement will be stalled and possibly damaged.

A further problem with adjustable external mirrors is that the mirror tends to vibrate relative to the housing, because of the single center pivot support and the use of only two points of support at the adjustment screws, which are generally located quite centrally of the mirror where the housing has the most depth to accommodate the adjusting mechanism and where the extent of axial movement of the adjusting screws is minimized for a given angular adjustment. A "nervous image" results from this vibration, and viewing through the mirror is difficult.

SUMMARY OF THE INVENTION

It is the object of the present invention to overcome the above disadvantages and provide an angularly adjustable, electrically controlled, motor vehicle accessory, particularly a rear view mirror, that is compact, relatively inexpensive to manufacture, that permits angular adjustment about two perpendicular axes utilizing a single stationary electric motor, that is quiet in operation, that is not damaged by manual adjustment, and which is substantially vibration-free in use. The present invention incorporates a number of novel features which combine to achieve such desiderata.

In a preferred embodiment of this invention, a mirror element is connected for universal pivoting to a support, such as a mirror housing, secured to an automotive vehicle. The connection is preferably by way of a backing member on the mirror that is secured to an inner support, such as a housing or casing carried within the outer mirror housing and which also serves as a mount for an electric motor and drive transmission, which operate to pivot the mirror. The drive transmission includes adjustment screws connected to the mirror, rotatable nuts in the casing that engage and move the adjustment screws to tilt and locate the mirror, a worm driven by the electric motor for rotating the nuts, and a solenoid operated control member for selectively engaging the worm with one nut or the other.

A one-piece backplate is used, in preference to any other, that provides universal pivoting through integral molded hinges and which incorporates integral screws for adjustment of the mirror angle about the pivot hinges. The adjustment screws extend from the backplate and are themselves supported for universal pivoting so that their direction of extent can remain substantially the same during angular adjustment of the mirror. The base of each integral screw is constructed so that it can move in the plane of the backplate, facilitating a swinging movement of the entire screw without changing its angle, which is necessary if accurate alignment is to be maintained during angular adjustment of the mirror, especially at extreme limits of angular adjustment. This single piece construction results in substantially reduced costs, provides a more reliable central pivot connection for the mirror element without the need for clamps or spring tensioning, and provides an adjusting mechanism that more accurately maintains alignment of the screws with the axis of the drive nuts and, hence, is more quiet in operation. Preferably, the backplate is injection molded of synthetic resin, for example, a polyester material.

The adjustment screws of the backplate are driven in axial directions by rotated nuts threadedly engaged with the screws through a yieldable medium. Advantageously, the threads of the nuts are carried on movable inserts yieldably biased into engagement with the associated screw and movable out of engagement in response to excessive force created between the screw and nut, as where a manual adjustment of the mirror is attempted or if mirror movement is obstructed while the motor is driving a nut. This avoids damage to the motor or drive system. In a preferred embodiment the inserts also serve to eliminate play between each screw and nut to reduce mirror vibration in use and to aid in maintaining a precise adjusted position of the mirror. In an alternative embodiment flexible bristles are used for providing a yieldable interconnection with the screw threads.

A single electric motor and a motor driven worm selectively rotate the nuts, which have external worm wheel teeth engagable by the worm, to drive the adjustment screws. The electric motor is mounted in a stationary position within the casing and mirror housing, which isolates it from inertial forces that otherwise might disengage the worm and nut. It further permits the motor to be effectively insulated to inhibit transmission of motor induced vibrations to the motor support, which would produce excessive noise. From the standpoint of consumer acceptance, quiet operation is an important consideration.

The worm is attached to and extends directly from the motor shaft. Selective engagement of the worm, with one of the nuts, is obtained through a flexible coupling between the worm and motor shaft and through a control member connected to the worm. Movement of the control member in one direction or another flexes the coupling and pivots the worm, selectively engaging the worm with either of two drive nuts. Preferably, the control member also pivots between these two selected positions and is operated by a solenoid. The control member advantageously takes the form of a pivoted frame or box that extends along the worm and is connected to the extending end of the worm. Portions of the box or frame limit the extent of engagement of the worm with the worm wheel teeth of either nut, eliminating the vibration and noise that is otherwise occasioned when the crest of the worm helix rubs against the root of the worm wheel teeth.

A novel worm of unitary construction is utilized which incorporates a flexible coupling that permits a change in angular relationship of the worm relative to the motor shaft while permitting rotation about the central worm axis. The coupling resists yielding in the axial direction of the worm, which would hamper transmission of force between the worm and worm gear teeth on the rotary nuts. Advantageously, an attachment sleeve portion of the worm fits over the motor drive shaft and is telescoped within a tubular portion that carries the worm helix, thereby substantially shortening the overall worm length without reducing the length of the helix of the attachment sleeve.

Vibration of the mirror element relative to the support, as normally induced by vehicle operation, is damped by elements carried by the mirror mounting plate, adjacent the mirror perimeter. These elements are yieldably biased into sliding frictional engagement with a fixed portion of the housing support and serve to stabilize the mirror in an adjusted position. The elements may be made of spring wire with portions that act as torsion springs, biasing extending portions against the surrounding mirror housing. Alternatively, plastic fingers can extend from the mirror backing and be biased by separate springs into sliding contact with the housing. In either event, it is important that the elements act without resiliency in the direction in which vibration is damped so that they most effectively eliminate the so-called "nervous image" that occurs with centrally supported mirrors that are subjected to vibration.

The above and other features and advantages of this invention will become more apparent from the detailed description that follows when considered in connection with the accompanying drawings.

BRIEF DESCRIPTION OF THE DRAWINGS

FIG. 2 is a view, partly in section and partly in elevation, showing the mirror housing, motor and gear drive casing, and an adjustably supported mirror;

FIG. 3 is a rear elevational view taken approximately along the plane indicated by the line 3—3 of FIG. 2;

FIG. 4 is a top plan view of the motor and drive casing and adjustable mirror, with the housing shown in phantom;

FIG. 10 is a top view, partly in section and partly in plan, of the mirror housing and mirror with parts removed, illustrating the manner in which vibration dampers cooperate with the housing as the mirror is pivoted;

FIG. 11 is a partial transverse sectional view through the casing and drive nut, taken in the plane of line 11—11 of FIG. 5;

FIGS. 12-14 are partial sectional views of the drive nut of FIG. 11, taken through three radial passages, illustrating the relationship of threaded inserts of the nut with the adjustment screw and nut;

FIG. 15 is a transverse sectional view of a second embodiment of a drive nut;

DESCRIPTION OF PREFERRED EMBODIMENTS

General Description of Assembly

Figure 1:
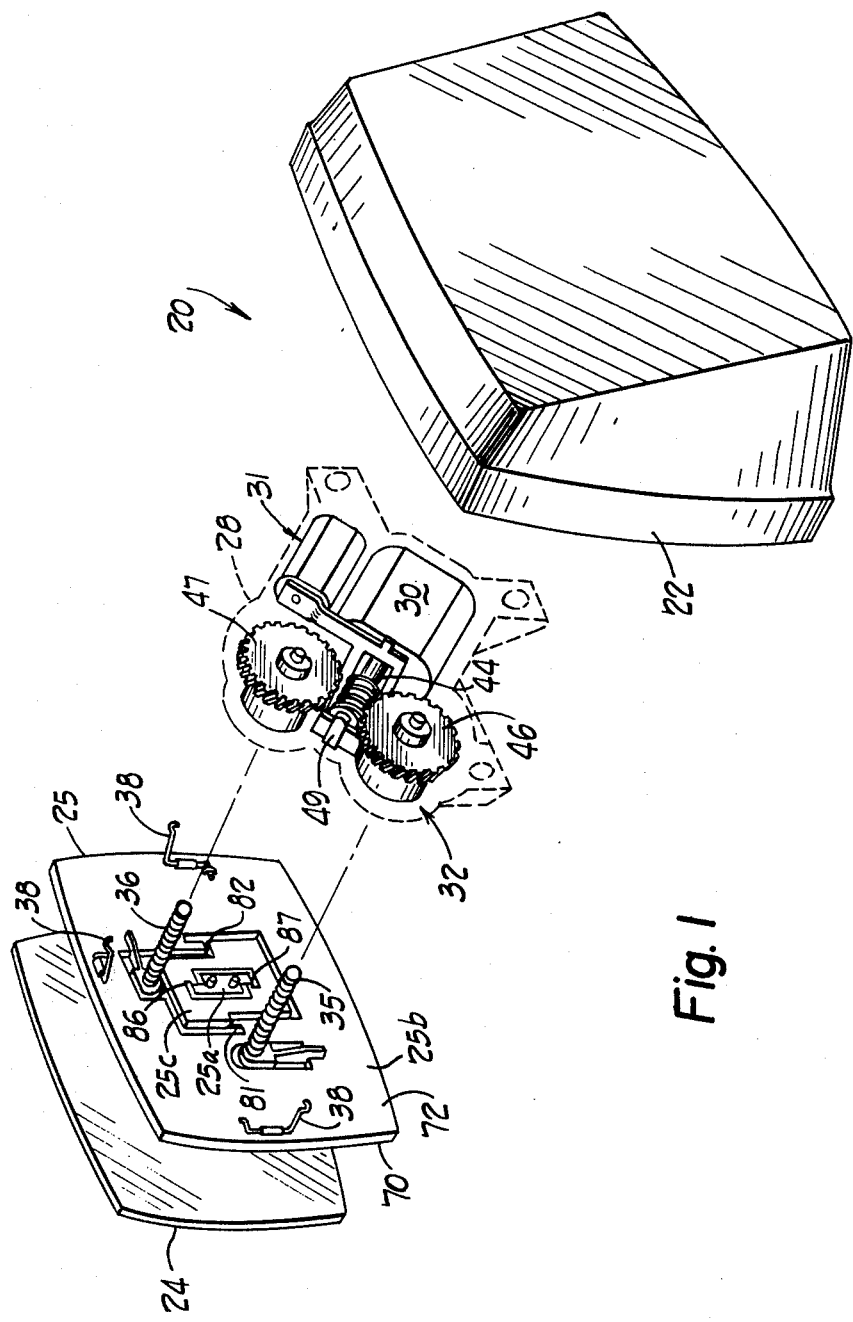
FIG. 1 is an exploded, perspective, view of a preferred embodiment of the invention.

A remote controlled electric motor operated mirror assembly 20 is shown in FIGS. 1-4, embodying the present invention. The mirror finds use as a rear view mirror for a motor vehicle and facilitates adjustment of the field of vision reflected to the viewer using an operating switch located within the vehicle.

The assembly includes a mirror housing 22 secured in a stationary position to the outside of the vehicle, as by a conventional mounting foot, bracket, or the like, not shown, which may be an integral part of the housing or be separately attached; a mirror element 24; a supporting backplate 25 to which the mirror element is secured; a casing 28 that is within the housing 22 and that supports the mirror backplate for angular adjustment; and a mirror drive within the casing, including an electric motor 30, a control solenoid assembly 31, and a drive transmission 32.

The mirror housing 22 is a metal casting with an open front 22a and of sufficient depth and frontal area to house the casing 28 and mirror element and backplate and to allow tilting of the mirror through the range illustrated in FIGS. 2 and 4. The housing provides a plurality of mounting surfaces 33 internally, and threaded bores 34 opening through the mounting surfaces to receive screws for securing the casing 28.

The backplate 25 includes a fixed central portion 25a secured to the casing and a surrounding portion 25b that is universally pivotable about the central portion through an integral flexible connection. Two adjusting members 35, 36 which are preferably screws extend rearwardly from the surrounding portion 25b of the backplate, offset from the central pivotforming portion. Each is located on one of two mutually perpendicular axes that pass through the center of the mirror and offset from the other axis, so that movement of only one screw will tilt the mirror about each axis. Each screw is separately driven in an axial direction relative to the casing 28 and housing 22, by the electric motor 30 and drive transmission 32, to cause the mirror element 24 to tilt. Vibration dampers 38 are carried by the backplate 25, at spaced locations on the surrounding portion 25b adjacent the perimeter of the mirror element, and are biased into sliding contact with the inside surface of the housing 22. The dampers 38 frictionally engage the housing to stabilize the mirror and substantially eliminate mirror vibration relative to the housing.

Figure 17:
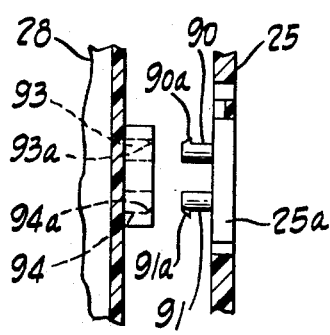
FIG. 17 is a view partly in elevation and partly in section of the motor casing and mirror backplate connecting portions in separated relationship.

The casing 28 is conveniently formed in two halves, 28a, 28b suitably of molded plastic, supports the center of the mirror backplate in a snap fit connection (FIG. 17) at a fixed position, and serves to contain, support and fix the location of the motor 30, solenoid 31 and drive transmission 32 relative to the housing.

The drive transmission 32 (FIGS. 1 and 5) housed by the casing includes a drive member 44, advantageously a worm; two rotatable driven members 46, 47, advantageously worm driven nuts; and an electrically operated control member 49 that in the preferred embodiment takes the form of a box or frame-like structure, that controls the position of the drive member through the operation of a solenoid. Openings 52, 53 (FIG. 3) in one half of the casing 28a and bosses in the other half of the casing one of which is shown at 56 in FIG. 11, journal the nuts 46, 47 for rotation and the casing itself restricts the axial movement of the nuts. The two circular openings 52, 53 and two aligned openings in the bosses, one of which is shown at 59 in FIG. 11, provide passages through the casing for the adjusting screws 35, 36 permitting their axial movement relative to the casing for mirror adjustment. The casing further provides pivot support for the control member 49. Three external mounting lugs 62 on the casing serve to secure the casing to the housing by screws 64 (FIG. 1) received in the threaded bores 34 of the mirror housing.

Mirror Backplate

The backplate 25 serves to support the mirror element 24, providing a pivotal attachment to the mirror housing 22 through the casing 28, and carries means driven relative to the support for pivoting the mirror and means to damp mirror vibration. Preferably, the backplate can be attached to its support through a snap fit for ease in assembly and to permit replacement without disassembly. It is formed of a flexible material, such as a suitable polyester chosen for its lack of memory, and is preferably injection molded.

Figure 16:
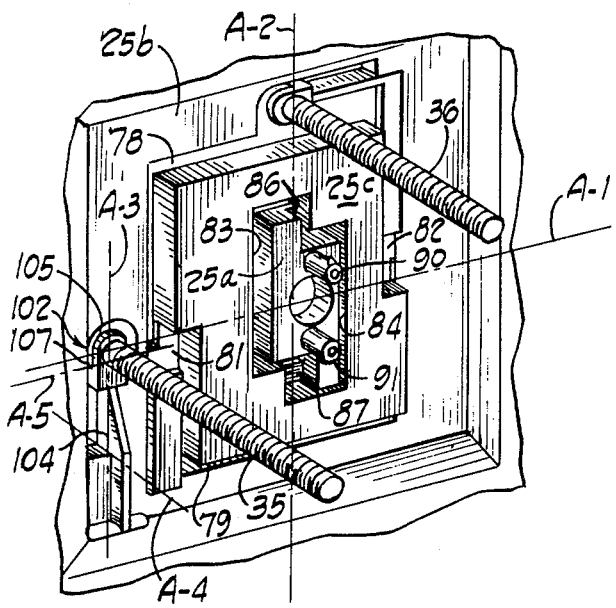
FIG. 16 is a partial perspective detailed view of the hinge construction of the backplate for mounting the mirror.

The backplate has a front surface 70 against which the mirror element is secured, as by cementing, and a back surface 72 that affords structure for attaching the backplate to the support and from which the adjusting screws 35, 36 extend. Preferably, the backplate is of a size and shape identical to that of the mirror element. As best shown in FIGS. 1 and 16, the backplate is divided into a fixed central portion 25a, a universally pivoted portion 25b, and an intermediate portion 25c that in part forms the pivot. Peripheral portion 25b is separated from portion 25c by slots 78, 79 through the thickness of the plate. The slots are on opposite sides of the center, and leave two narrow hinges 81, 82 on opposite sides of the center on a first axis A-1 that passes through the center of the backplate. The central fixed portion 25a is separated from the intermediate portion 25c by two slots 83, 84, on opposite sides of the center of the backplate that leave two narrow hinges 86, 87 on opposite sides of the center on a second axis A-2 through the center of the backplate and perpendicular to the axis A-1. The hinges 81, 82, 86, 87 are of thinner cross section than the remainder of the backplate to enhance their flexibility. With this construction, the central portion 25a is connected to the peripheral portion 25b only by the four hinges 80, 81, 86, 87 on mutually perpendicular axes.

Two studs 90, 91 (FIGS. 16 and 17) extend from the inner central portion 25a rearwardly from the backplate, and when the backplate is assembled to the casing 28, the studs are received in two apertures 93, 94 (FIG. 17) of the casing. Preferably each stud 90, 91 includes a tapered portion 90a, 91a that cooperates with an internal rim 93a, 94a of each aperture so that the studs can be readily inserted, will be retained during use, but can be removed without disassembly of the casing for replacement.

The vibration dampers 38 are in the form of projecting fingers secured to a marginal portion of the back surface 72 of the backplate, that extend into frictional engagement with the surrounding housing 22 and which slide relative to the housing as the mirror is moved in adjustment. The peripheral contact between the mirror and housing serves to damp vibrations of the mirror that would otherwise be present due to the central support of the mirror. One preferred embodiment of the dampers 38 is shown in FIGS. 3 and 4 of the drawings. Each damper is a spring metal wire 96 in the form of a torsion spring held to the back surface of the backplate by a tap 97 at the margin of the plate. One portion 96a of the wire 96 extends rearwardly of the back surface of the backplate to contact the surrounding housing 22 on an inside surface. The portion 96a extends substantially straight back, i.e., as perpendicular to the plane of the mirror as possible, but with a slight outward extent to bridge the clearance gap between the mirror and the housing. A part of the spring metal wire 96b extends along the back surface of the backplate parallel to the adjacent backplate edge and serves as the torsion spring portion. An end portion 96c also extends along the back surface of the backplate transversely of the portion 96b, preventing rotation of the portions 96a, 96b relative to the backplate. The torsion portion 96b biases the extending portion 96a into frictional contact with the inside surface of the housing 22. The distal end of the portion 96a is curved to provide a smooth surface for sliding in the directions of mirror movement. As a result of this construction, the spring action of the dampers is only perpendicular to the direction of relative sliding movement. Thus, vibrational movement of the mirror is rigidly resisted through the dampers and their frictional contact with the housing, rather than through any spring action which would be less efficient in damping vibration. As a result, the dampers are effective in eliminating the relative vibrational movement in directions transverse to the plane of the mirror surface, which cause nervous image. In the embodiment shown, the vibration dampers or wires 96 are at three spaced locations about the periphery of the backplate, spaced approximately 90° from each other considered angularly with respect to the center of the mirror. If desired, additional dampers could be provided.

In another embodiment, shown in FIG. 10, the dampers 38 are in the form of plastic tabs 98 hinged to the back surface of the backplate and biased outwardly by separate metal springs 99. Where the backplate material does not have the desired frictional characteristics to provide relatively smooth sliding yet adequate frictional resistance, the tabs may be of a different material from the backplate and adhesively or thermoplastically bonded to the backplate. In addition, rather than individual tabs, a continuous peripheral skirt could be provided on the backplate.

Figure 20:
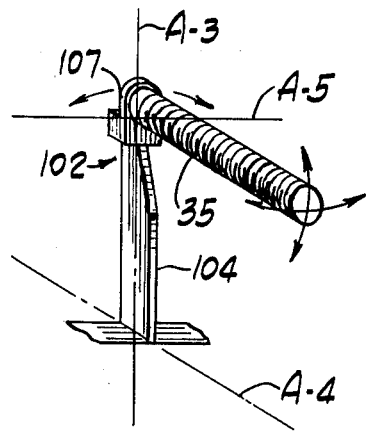
FIG. 20 is a partial detailed perspective view of a mounting for an adjusting screw illustrating the movements accommodated.

The two adjusting members 35, 36 are essentially the same in construction but are located in different positions. Accordingly, only the screw 35 and its mounting structure will be described in detail. A base support structure 102 for the adjusting screw 35, integral with the backplate, is shown in FIGS. 16 and 20 of the drawings. This base support structure consists of a cantilevered arm 104 projecting into an opening 105 in the backplate. The opening provides sufficient space around the cantilevered arm and base of the screw for relative movement of the screw in directions within the plane of the backplate. The cantilevered arm 104 is thick in the direction of the backplate thickness and is narrow in width. As a result, the arm substantially resists movement out of the plane of the backplate, i.e., in a direction axially of the screw, but will twist about its own longitudinal axis A-3 and facilitates lateral swinging of the arm about an axis A-4 at the base of the arm. One end of the screw 35 is attached at one side by a thin hinge portion 107 that permits the screw to pivot relative to the arm 104 about an axis A-5 that is tangent to the screw and transverse to the arm, and which is in the plane of the backplate. As shown by the arrows in FIG. 20, this construction permits universal pivoting of the adjusting screw at the base, as well as swinging of the base to shift the axis of the screw transversely, keeping the base within the plane of the backplate, so that the screw can remain a constant distance from the pivot axis of the mirror as the mirror and backplate pivot. As a result, when the mirror pivots, the base of the screw will move relative to the backplate to keep the screw in line with the drive nut axis. Since the drive nut axis does not move, this adjustment of the screw base eliminates the forces that would otherwise be created by nonalignment and assures a smoother and quieter operation.

Motor and Worm Drive

Figure 5:
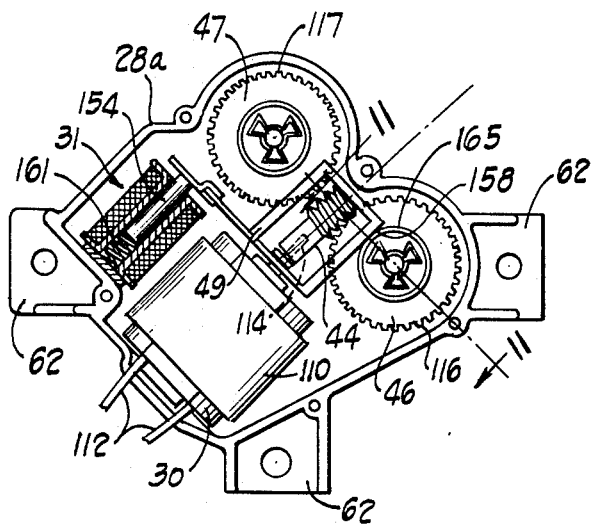
FIG. 5 is an elevational view of one half of the motor casing and the mirror drive mechanism housed therein.
Figure 18:
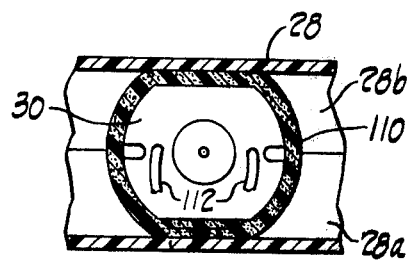
FIG. 18 is a transverse sectional view of the casing, illustrating the manner in which the electric motor of the mirror drive is mounted.

As best illustrated in FIGS. 5 and 18, the motor 30 is secured in a stationary position within the casing 28 and is surrounded by a cushioning material, for example, a foamed strip 110 wrapped around the motor and adhesively adhered to inhibit motor vibrations from being transmitted to the casing and housing. When the two halves 28a, 28b of the casing are joined, the motor is tightly held in a stationary position within the casing. Electrical leads 112 to the motor extend through the casing for connection to a source of electrical energy. The shaft 114 (FIGS. 5 and 8) of the motor extends within the casing toward the nuts 46, 47.

The drive worm 44 is secured to and extends from the motor shaft 114, between the drive nuts 46, 47, which are rotatable about axes transverse to and offset on opposite sides from the axis of the worm. The nuts 46, 47 have worm wheel teeth 116, 117 in a common plane with the worm axis. The peripheries formed by the teeth of the two nuts are spaced apart a distance greater than the outside diameter of the worm 44 so that movement of the worm in the common plane of the worm wheel teeth can selectively engage the worm with one or the other of the nuts.

Figure 7:
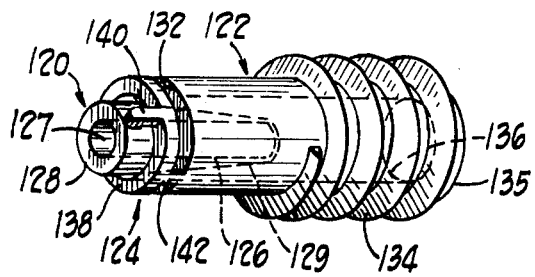
FIG. 7 is a perspective view of a worm forming a part of the mirror drive.
Figure 8:
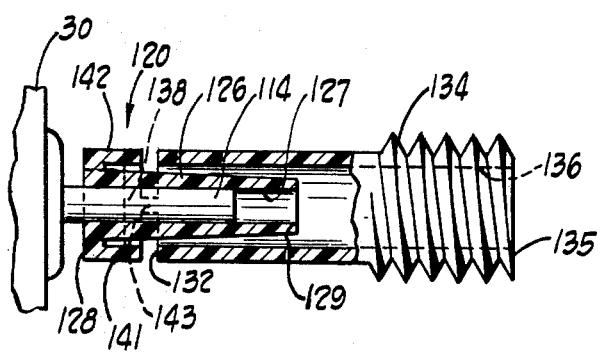
FIG. 8 is an elevational view, with parts in section, of the worm of FIG. 7.

The worm, as best shown in FIGS. 7 and 8, fits partially over the motor shaft 114 with a friction fit, is universally pivotable relative to the shaft, and is of a unitary construction that minimizes the combined axial length of the worm and shaft for compactness, and that is capable of being injection molded. By the incorporation of a universal pivot into the worm construction, selective engagement of the worm with one or the other of the nuts is facilitated without movement of the motor 30.

The worm 44 includes a first portion 120 for attachment to the motor shaft 114, a second portion 122 for engagement with the nuts 46, 47, and a third portion 124 that interconnects the first and second portions for relative pivoting.

The first portion 120 is comprised of a tubular body 126 with a cylindrical central opening 127, a flange 128 at the outer end of the body, and a tapered outer surface 129 that diminishes the outside diameter of the body in a direction from the flange toward the second portion of the worm. At least a part of the tubular body 126 is received within the second portion 122 with a surrounding clearance.

The second portion 122 is a cylindrical tube connected at one end 132 with the first portion and with an external worm thread or helix 134 adjacent a distal end 135. A central opening 136 through the second portion receives the tubular body 126 at the end 132 and facilitates interconnection with the control member 49 at the end 135.

The third portion 124 of the worm is comprised of a ring 138 and four connecting fingers 140–143 joining the ring to the first and second portions. The ring is located between the end 132 of the second portion and the flange 128 of the first portion, is axially spaced from each and encircles the tubular body portion 126. The inside and outside diameters of the ring correspond with those of the tubular second portion. Two of the connecting fingers 140, 141 extend axially of the worm between the ring 124 and the flange 120, at diametrically opposite locations. The other two fingers 142, 143 extend between the ring 138 and the end 132 of the second portion 122, at diametrically opposite locations displaced 90° about the ring from the fingers 140, 141. The ring 138 is flexible between the fingers 140–143, providing a universal pivoting action between the first and second portions, in the plane of the ring. The outer tapered surface 129 of the first portion 120 provides clearance between the first and second portions to facilitate a desired degree of relative pivoting without interference.

The worm 44 constructed as described is preferably fabricated from a synthetic resin that can be economically injection molded and which has inherent resilience and flexibility that permits the first portion 120 to be forced onto the drive shaft of the motor with a tight friction fit to transmit rotation and which permits the desired flexibility of the ring 138 for the pivoting of the second portion relative to the first. By telescoping the ring 138 and second portion 122 about the first portion 120, the overall length of the worm 44 is substantially reduced, moving the pivot point to a location about the drive shaft of the motor, rather than beyond the drive shaft.

Figure 6:
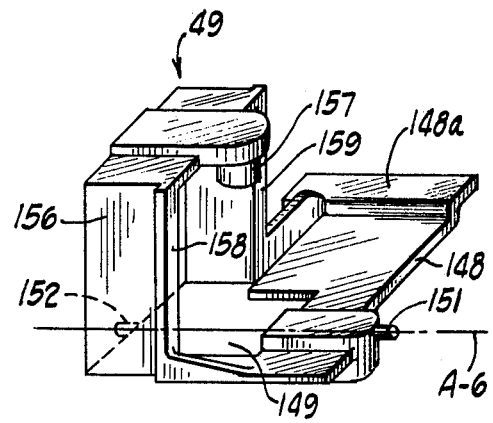
FIG. 6 is a perspective detailed view of a control member for part of the mirror drive.

Control of the position and movement of the drive worm 44 is achieved through box- or frame-like control member 49 shown in FIGS. 5 and 6. The control member is pivotally supported by the casing 28 about an axis A-6 transverse to the worm 44 and intersecting the ring 138. Energization of the solenoid 31 moves the control member to shift the worm from one nut 46, 47 to the other and limits engagement of the worm with a nut to the proper tooth depth.

The control member 49 is comprised of a pivoted arm 148 with an aperture 149 through which the worm 44 extends. Two stud shafts 151, 52 extend from the arm 148 on opposite sides of the aperture 146, on an axis that bisects the aperture, and are received in apertures in opposite halves 28a, 28b of the casing, to locate the control member in a position shown in FIG. 5, i.e., with the axis of the stud shafts intersecting the longitudinal axis of the worm 44 at the universal connection formed by the ring 138. A portion 148a of the arm 148 most remote from the stud shafts 151, 152 is secured to a plunger 154 of the solenoid 31.

A housing 156 extends outward from the plane of the arm 148 and supports a cylindrical bearing boss 157 in axial alignment with the center of the aperture 149, in a position to be received within the central opening 136 at the end 135 of the worm. Pivoting of the arm 148 about the stud shafts 151, 152 will then cause the bearing boss 157 to swing the worm about its universal pivot. The bearing boss also keeps the worm from flexing about the pivot in a direction away from a nut when it is forced into a driving relationship. The housing 156 has two walls 158, 159 to one side of the bearing boss 157 in a plane transverse to the pivot axis A-6 of the two stud shafts. The walls are located and spaced to act against obstructions, such as a cylindrical portion of the drive nuts, when the control member is pivoted, and thereby serve to accurately limit the extent to which the control member and worm may be pivoted by the solenoid 31. This limits the depth to which the worm helix can engage the worm wheel teeth. The worm is moved to one of two positions by the control member when the plunger is withdrawn by energization of the solenoid and to the other position when the solenoid plunger is extended by a compression spring 161 in the absence of energization. In one position the worm engages the nut 46 and in the other position it engages the nut 47.

Drive Nuts

The worm driven nuts 46, 47 interconnect the worm 44 with the adjusting screws 35, 36 to move the screws relative to the casing 28 and fixed pivot of the mirror backing, thereby tilting the mirror to a desired inclination. The drive nuts are constructed to permit slippage between the screws and nuts when forces are created therebetween that are greater than the normal driving forces. As a result, the nuts can be rotated or the screws can be moved axially without the corresponding movement of the other, thereby avoiding damage of the motor or drive train when the limits of mirror travel are reached or if the movement of the mirror is obstructed, or if the mirror is pivoted from an externally applied force. Each nut 46, 47 is identically constructed and only the nut 46 will be described in detail.

Figure 9:
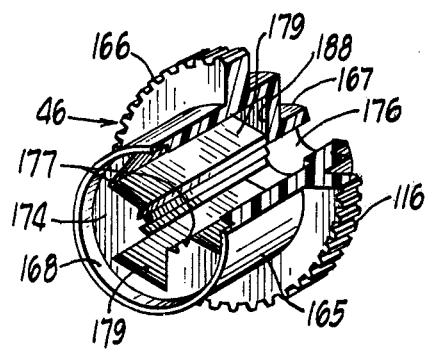
FIG. 9 is a perspective view, with parts cut away, of a drive nut forming part of the mirror drive.

As shown in FIGS. 9 and 11, the nut 46 has a generally cylindrical body portion 165, a larger diameter worm wheel portion 166 in which the teeth 116 are formed, a journal portion 167 at one end and a recess 168 at the other end. The journal portion and recess support the nut for rotation in the casing 28, as shown in FIG. 11. The journal portion 167 is received in the opening 52 and the recess 168 receives the boss 56 of the casing. A bearing washer 171 and a thrust washer 172 are received in the recess 168, acting between the boss 56 and an end wall 174 of the recess 168. As best shown in FIG. 5, the cylindrical body portion 165 serves as an abutment for the adjacent side wall 158 of the control member 49 to limit the extent of its pivotal movement. Thus the cylindrical portion controls, through the member 49, the depth of engagement of the thread 134 with the teeth 116 of the nut. A central passage 176 extends axially through the nut for receiving the associated adjusting screw 35. Axial surface portions 177 (three in the preferred embodiment) at equally spaced locations circumferentially about the aperture engage the crests of the screw threads, thereby maintaining the nut and lead screw coaxial. The surface portions 177 are located between axially extending cavities 179 equiangularly spaced about the central axis and which open into the central passage 176.

The three cavities 179 carry yieldable thread engaging parts, one embodiment of which is indicated at 181 in FIG. 11 and a second embodiment of which is shown at 182 in FIG. 15. These parts 181 or 182 provide driving interengagement between the nut body and adjusting screw, but yield if a force substantially greater than that normally experienced during driving is applied. As a result, rotation of the nut can occur without axial movement of the screw, or axial movement of the screw can occur without rotation of the nut. Thus, under normal load conditions, when the worm thread 134 is engaged with the teeth 116 and rotated, the nut is rotated, driving the adjusting screw within the central passage 176 in an axial direction, through the thread engaging parts 181 or 182. Under greater than normal load conditions, slippage will occur.

With reference first to the embodiment shown in FIGS. 11-14, the thread engaging parts 181 constitute a thread insert 186 in each cavity 179. Each thread insert is identical, has a number of partial threads 187, for example, three, and is suitably formed of plastic, as by injection molding. The length of all thread inserts 186 is the same and less then the length of the receiving cavities 179, all of which are of equal length. The cavities terminate in coplanar end walls 188 at one end and at the washer 171 at the other end. The length of the inserts is selected to provide an end clearance within the cavities that is less than the pitch of the adjusting screw thread (i.e., less than the axial distance between successive crests of the thread) by an amount that prevents two of the inserts from adjusting sufficiently in the axial direction to fully engage the thread portions 187 with the screw thread. The height of the inserts 186, i.e., the dimension in the direction of the radial depth of the receiving cavity 179, is less than the depth of the cavity by at least the height of the thread parts on the insert. Each insert is individually biased in a direction toward the central passage by a spring 189 located within each cavity. The spring is constructed to allow longitudinal movement of the insert while biasing the insert centrally of the passage 176. In the preferred embodiment a coil spring is used located with respect to the insert by a boss 190 on the back surface of the insert.

By virtue of the three angularly displaced positions of the cavities 179 and the limited clearance for endwise or axial movement of the inserts, the threads of all three inserts cannot fully engage the threads of the adjusting screw. Rather, when two of the inserts are located against opposite ends of their respective cavities, the teeth will not fully engage the thread of the adjusting screw, while the third insert will, because its cavity will be at a location axially positioned relative to the threads of screw 35 or 36 for the thread portions of the insert to fully mesh. FIGS. 12-14 show this relationship, with one insert against the washer 171, another centrally located within the axial extent of the cavity, and the third abutting the end wall 188 of the cavity. The two inserts engaging the ends of the cavities have not been able to move axially a sufficient distance to fully mesh with the thread of the screw and have therefore been cammed away from the screw into the cavity against the force of the springs 89.

As a result of two of the inserts being located at opposite ends of the cavities of the nut and biased by the springs against the thread of the lead screw, so each tends to wedge the screw in opposite directions, axial play between the lead screw and nut, otherwise inherent in a clearance fit, is minimized. Further, the thrust washer 172 biases the nut in one direction, against the casing, eliminating any axial play between the screw and casing due to a clearance between the nut and supporting portions of the casing. This makes possible a more accurate mirror adjustment without the slight vibration that otherwise could exist in the absence of a positive relationship between the fixed mount and the adjusting screws.

It will be appreciated that as long as the adjusting screw is driven by the nut, the relationship of the three inserts will remain the same with respect to their cavities and the screw. Upon the screw reaching the end of its possible travel, further rotation of the nut will cause the inserts to travel axially within the cavities and to be cammed outwardly of the central cavity so as to jump over the threads rather than stopping rotation of the nut. Similarly, if the adjusting screw is forced axially without rotation of the nut, all inserts will be moved toward one end of the respective recess and the threads on the screw will cam the inserts outwardly from the central axis and so the screw can move past.

With reference to the embodiment of FIG. 15, each cavity 179 contains an insert 182 in the form of bristles or fur, for example, nylon bristles 192 projecting in a generally aligned fashion from a base 194, that extend radially inward into the central passage, into engagement with the adjusting screw. The bristles are deformable, yet stiff enough to transmit axial thrust in response to relative rotation between the nut and screw. The resiliency of the bristles limits the amount of thrust that can be transmitted by rotating the nut and, conversely, will resist only a limited axial thrust applied to the screw. This permits relative slippage between the nut and adjusting screws under forces greater than normal drive forces. The inserts 182 have the advantage of low cost and convenient assembly, but are not as effective as the inserts previously described in eliminating axial play between the nut and screw. In addition, moisture affects certain materials utilized as the bristles.

Electric Control

Figure 19:
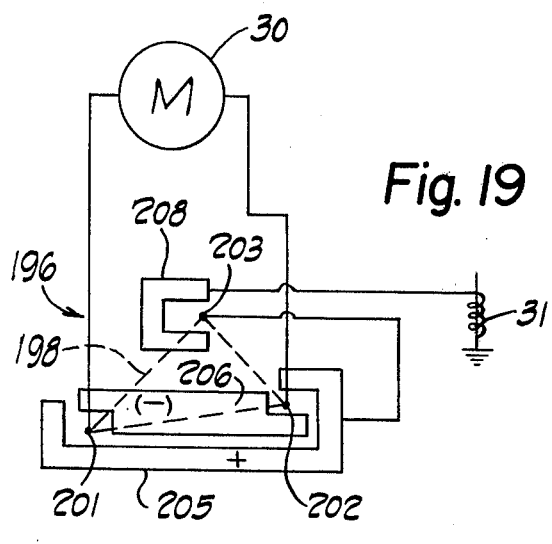
FIG. 19 is a diagrammatic view of an electric switch circuit for operating the drive motor to adjust the mirror in angular relationship to the housing.

Electric motor 30 is a reversible DC motor connected to a source of direct current through a switch 196 shown diagrammatically in FIG. 19. The switch 196 also controls the solenoid 31. A preferable switch is one in which a single actuator can be moved in four directions to different portions, two of which operate the motor in a forward direction and two in a reverse direction. In one of the two positions that operate the motor forward and one of the two positions that operate the motor in reverse, the solenoid in energized by the switch. With this arrangement, the worm 44 can be selectively driven in one of two directions and engaged with one of two drive nuts to selectively tilt the mirror in two directions about two mutually perpendicular axes. A suitable switch is commercially available through the McGill Manufacturing Company, Inc., Valpariaso, Ind.

As shown diagrammatically in FIG. 19, an operating element 198 is movable by hand from a central off position shown, in four different directions, to the right or left, and forward or back, in the orientation of FIG. 19. Three contacts 201, 202 and 203 are carried by the lever for concurrent movement. A positive terminal 205 and a negative terminal 206 cooperate with the two contacts 201, 202. A contact 208 cooperates with the contact 203. Each of the contacts 201, 202 is connected to the windings of the motor 30. The positive and negative terminals 205, 206 are preferably provided on a printed circuit board and are configured so that movement of the contacts 201, 202 either to the right or forward in the orientation shown will connect the contact 202 to the positive terminal and the contact 201 to the negative terminal to drive the motor in one direction. Movement of the contacts 201, 202 either to the left or back, will connect the terminal 202 to the negative terminal and the contact 201 to the positive terminal, driving the motor in the opposite direction.

The contact 203 is electrically connected to the positive terminal 205 and a printed circuit contact 208 is electrically connected to the coil of the solenoid 31. The contact 208 is shaped so that movement of the actuator 198 to the right and left fails to connect the positive movable contact 203 with the connector contact 208, but movement of the lever arm forward and back does. Thus, when the lever is moved forward or back, the solenoid 31 is energized, changing the engagement of the worm from the drive nut 46 to the drive nut 47. It will be apparent then that when the switch is moved forward or back to move the mirror about the horizontal axis, the solenoid 31 is energized and the worm is engaged with the nut 47, driving it selectively in one direction or another. When the lever arm is moved to the left or right, the solenoid is not energized and the worm is spring biased into engagement with the nut 46, selectively driving it in one of two directions, to pivot the mirror about the vertical axis.

Summary of Operation

While it is believed that the operation of the assembly will be clear from the foregoing description, for convenience, it will be summarized here.

The mirror element 24 is supported for pivoting about a fixed location relative to the casing 28 and housing 22 at the center of the mirror, through a flexible portion of the backplate 25. The flexible connection is such that universal pivoting is permitted by virtue of flexible portions of the plate that define mutually perpendicular horizontal and vertical pivot axes. The mirror backplate and mirror element are held against unwanted movement by the two adjusting screws 35, 36 which extend rearwardly from the backplate and into engagement with the drive nuts, which are held in a fixed position. The mirror is damped against vibration by the dampers 38 that are slidable relative to the housing 22 when the mirror is pivoted.

To change the angle of the mirror, the operating element 198 of the control switch is moved in one of four directions to pivot the mirror in one of two directions about either a horizontal or a vertical axis. Because the screws 35, 36 are each on one of the pivot axes, adjustment of only the screw that is offset from the pivot axis about which movement is desired is sufficient. To adjust the mirror about the vertical axis, the motor 30 is energized in one of two directions to drive the worm 44, which in turn drives the nut 46 in one of two directions to move the adjusting screw axially inward or outward from the housing, thereby tilting the mirror about the vertical axis A-2.

To tilt the mirror about the horizontal axis A-1, the solenoid 31 is energized to bring the worm 44 into engagement with the drive nut 47, and the motor is driven in one of two directions, to move the adjusting screw associated with the nut 47 in or out relative to the fixed housing.

In either direction of drive, the worm is pivoted about the integral universal pivot joint to one side or the other of the axis of the motor shaft, while the motor remains stationary.

Because the extent to which the worm 44 engages either nut 46, 47 is limited by the control member 49, little or no rubbing occurs between the crest of the worm helix and the root of the worm wheel. In addition, there is no tendency of the worm to vibrate as it rotates, as it might if fully engaged, due to any slight eccentricity or lack of roundness of the worm thread. Further, vibration of the electric motor is damped by the surrounding foam strip 110. The operation is quiet.

In the event the mirror is driven to the end of its available travel, and rotation of the drive nut is continued, slippage will occur between the drive nut and adjusting screw by virtue of the yieldable thread engaging parts 181.

While a preferred embodiment of the invention has been described in detail and certain modifications disclosed and suggested, it will be apparent to those skilled in the art that various other modifications or alterations may be made therein without departing from the spirit and scope of the invention set forth in the appended claims.

We claim:

1. A drive nut for use with a screw, comprising a body with a central passage in which a screw is receivable, means carried by said body in a position to act against external threads of a screw in said central passage to drivingly interconnect the body with a screw so that relative rotation between the screw and body will move one relative to the other in a direction axially of the screw, said means being yieldable from a position at least partially within said passage in engagement with the threads of a screw to a position radially outwardly therefrom out of engagement with the threads in response to relative axial movement between the two without relative rotation or in response to relative rotation between the two without relative axial movement.

2. A drive nut as set forth in claim 1 wherein non-resilient portions of said body locate a screw concentrically with the central passage.

3. A drive nut as set forth in claim 2 wherein said nut is rotatable and includes a worm gear-forming portion about a portion of its outer periphery.

4. A rotatable drive nut as set forth in claim 2 wherein said means is comprised of flexible fibers oriented predominantly transversely of the axis of the central passage.

5. A rotatable drive nut for use with a longitudinally movable screw, comprising a body with an outer peripheral surface adapted to engage a drive member and a central passage in which a screw can move axially, means carried by said body in a position to act against external threads of a screw in said central passage to drive said screw axially of said passage in response to rotation of said nut, said means being yieldable in a direction transversely of said axial direction in response to relative axial movement between the two without relative rotation or in response to relative rotation between the two without relative axial movement.

6. A rotatable drive nut as set forth in claim 5 wherein said outer peripheral surface includes a worm gear-forming portion.

* * * * *